(12) United States Patent
Nield et al.

(10) Patent No.: US 11,488,266 B2
(45) Date of Patent: Nov. 1, 2022

(54) SYSTEM FOR COMMUNICATING BETWEEN EQUIPMENT ON A PLURALITY OF SKIDS ON A DRILL RIG

(71) Applicants: Barry J. Nield, Jacksonville Beach, FL (US); George A. Nield, Jacksonville Beach, FL (US)

(72) Inventors: Barry J. Nield, Jacksonville Beach, FL (US); George A. Nield, Jacksonville Beach, FL (US)

( * ) Notice: Subject to any disclaimer, the term of this patent is extended or adjusted under 35 U.S.C. 154(b) by 519 days.

(21) Appl. No.: 16/537,607

(22) Filed: Aug. 11, 2019

(65) Prior Publication Data

US 2021/0042856 A1 Feb. 11, 2021

(51) Int. Cl.
*G06Q 10/00* (2012.01)
*G06Q 50/02* (2012.01)
*G06Q 10/08* (2012.01)
*E21B 41/00* (2006.01)

(52) U.S. Cl.
CPC ......... *G06Q 50/02* (2013.01); *E21B 41/0092* (2013.01); *G06Q 10/087* (2013.01)

(58) Field of Classification Search
CPC .............................. G06Q 50/02; G06Q 10/087
See application file for complete search history.

(56) References Cited

U.S. PATENT DOCUMENTS

| | | | |
|---|---|---|---|
| 9,298,803 B2 | 3/2016 | Wallace | |
| 9,466,038 B2 | 10/2016 | Kezeu | |
| 9,904,883 B2 | 2/2018 | Liston | |
| 9,938,693 B1 | 4/2018 | Reed | |
| 10,070,262 B2 | 9/2018 | McCormick | |
| 10,134,007 B2 | 11/2018 | Göllü | |
| 10,204,388 B2 | 2/2019 | Fosburgh | |
| 10,419,882 B2 | 9/2019 | Bordelon | |
| 10,531,304 B2 | 1/2020 | Zeiler | |
| 10,540,728 B2 | 1/2020 | Erestam | |
| 2003/0101156 A1* | 5/2003 | Newman | G06F 16/40 |
| 2004/0153245 A1* | 8/2004 | Womer | E21B 44/00 |
| | | | 702/9 |

* cited by examiner

*Primary Examiner* — Rokib Masud
(74) *Attorney, Agent, or Firm* — Steve LeBlanc, LLC

(57) ABSTRACT

A system for communicating between equipment on a plurality of skids associated with a drill rig and a database server remote from the drill rig includes a data acquisition board on the drill rig. A plurality of sensors on the drill rig are configured to transmit data associated with the equipment on the plurality of skids to the data acquisition board. A processor in communication with the data acquisition board is configured to execute a first logic that causes the processor to receive the data from each sensor within a project area defined by a predetermined distance from an predefined reference point or a predetermined list, format said received data, and transfer the received data to the database server.

20 Claims, 7 Drawing Sheets

| PROJECT ID | PROJECT TYPE | PROJECT AREA | PROJECT DATE | PROJECT PERIOD | |
|---|---|---|---|---|---|
| | | | | START | STOP |
| PROJECT 1 | TYPE 2 | ZONE 2 | 2019-07-25 | 8:00 AM | 4:00 PM |
| PROJECT 2 | TYPE 1 | ZONE 3 | 2019-07-25 | 10:00 AM | 12:00 PM |
| PROJECT 3 | TYPE 4 | ZONE 5 | 2019-07-26 | 6:00 AM | 12:00 PM |
| PROJECT 4 | TYPE 3 | ZONE 1 | 2019-07-27 | 8:00 AM | 5:00 PM |

Fig. 4

SYSTEM FOR COMMUNICATING BETWEEN EQUIPMENT ON A PLURALITY OF SKIDS ON A DRILL RIG

FIELD OF THE INVENTION

The present invention generally involves a system and method for communicating with, and between, assets on a plurality of skids on a drill rig and a remote database server or personal device. In particular embodiments, the system and method may be incorporated into land-based or offshore drill rigs used for gas production or well service operations for locating assets, grouping assets and monitoring assets.

BACKGROUND OF THE INVENTION

Drill rigs are commonly used in oil and gas production and well service operations and include heavy-duty machinery and other assets to bore substantial distances below the earth's surface. Notably, such drill rigs are often located in remote locations and frequently share the more expensive machinery normally found on a drill rig. Thus, skidding systems are utilized to move large structures and heavy-duty machinery around a drill rig or platform or between drill rigs. Skidding systems include three main types: cantilever skidding, drill floor skidding (lift and roll), and module skidding. Skid modules often include pumping systems (e.g., mud pumps) and power generation systems.

Systems have been developed for communicating with and monitoring drill rigs and the equipment associated with drill rigs. One prior art apparatus and method for improved communications with a drill rig is disclosed in U.S. Pat. No. 9,845,663 (663) issued on 19 Dec. 2017 to Barry Nield. Another apparatus is disclosed in U.S. patent application Ser. No. 16/443,198 (198) filed by Barry Nield et al. on 17 Jun. 2019. Yet another apparatus is disclosed in U.S. patent application Ser. No. 16/504,307 (307) filed by Barry Nield et al. on 7 Jul. 2019. The entire contents of such references are hereby incorporated by this reference for all that they disclose for all purposes. The Nield '663, '198 and '307 inventions work well for their intended purpose, but they are not specifically directed to identifying assets at a particular predetermined location on a drill rig and allocating such assets for future work projects on the drill rig. The currently disclosed apparatus and method improve upon the Nield '663, '198, and '307 inventions by enhancing the detection and identification of assets in a particular predetermined area on a drill rig or a predetermined list to facilitate grouping such assets for use in a future work project on the drill rig.

BRIEF DESCRIPTION OF THE INVENTION

Aspects and advantages of the invention are set forth below in the following description, or may be obvious from the description, or may be learned through practice of the invention.

One embodiment of the present invention is a for communicating between equipment on a plurality of skids associated with a drill rig and a database server remote from the drill rig. The system includes a data acquisition board on the drill rig. A plurality of sensors are associated with the equipment on the drill rig, and each sensor transmits data associated with the equipment to the data acquisition board on the drill rig. A processor in communication with the data acquisition board may be configured to execute a first logic stored in a first memory that causes the processor to receive the data from each sensor within a project area defined by a predetermined distance from a predefined reference point, format the received data, and transfer the received data to at least one of a database server, a local data center, a local personal device, a remote personal device or a display device. A personal device may be any type of computing device including mobile devices, whereas a mobile personal device may be a smartphone, tablet computer or similar technology.

Another embodiment of the present invention is a system for communicating between equipment on a plurality of skids associated with a drill rig and a database server remote from the drill rig. A data acquisition board is disposed on the drill rig. A plurality of sensors are associated with the equipment on the drill rig, and each sensor transmits data associated with the equipment to the data acquisition board. The data comprises an operating parameter of the equipment on the plurality of skids and skid identification information for the operating parameter. A processor in communication with the data acquisition board is configured for executing a first logic that causes the processor to receive the data from each sensor in a first predetermined list of the equipment on the plurality of skids, format the received data, and transfer the received data to the database server remote from the drill rig. The data may also be transferred to one or more of a local data center, a local personal device, a remote personal device or a remote display device.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 4 is a screenshot of an exemplary graphical user interface depicting a Project List display;

DETAILED DESCRIPTION OF THE INVENTION

Figure 1:
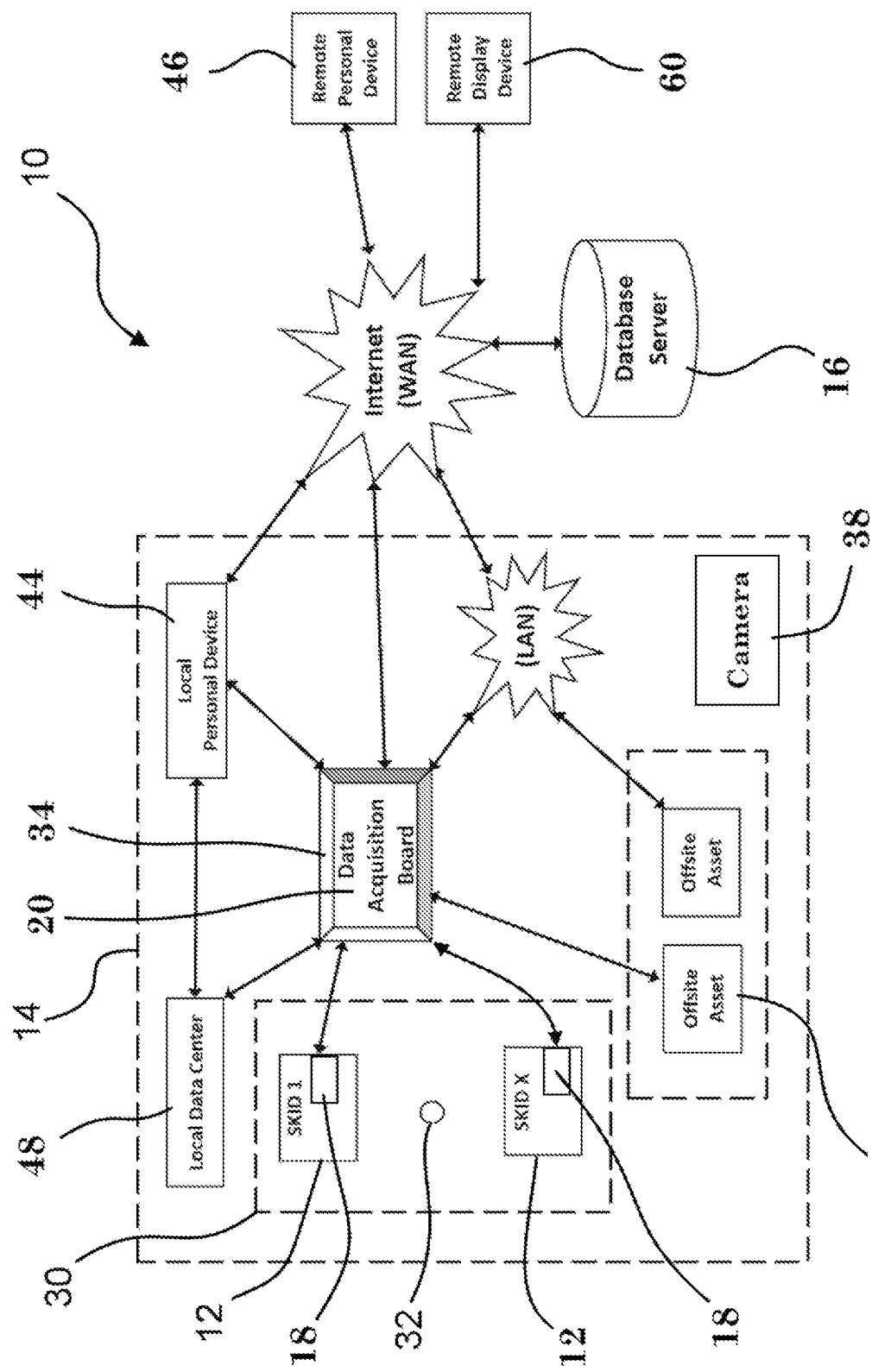
FIG. 1 is a block diagram of an exemplary system and method for communicating between equipment on a plurality of skids associated with a drill rig according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used in the claims, the definite article "said" identifies required elements that define the scope of embodiments of the claimed invention, whereas the definite article "the" merely identifies environmental elements that provide context for embodiments of the claimed invention that are not intended to be a limitation of any claim. As used herein, the terms "first," "second," and "third" may be used interchangeably to distinguish one component from another and are not intended to signify location or importance of the individual components. A "skid" is a conveyance or any device used in the art that makes equipment more mobile (e.g., trailers, sled with runners, sled with pontoons, etc.).

A drilling rig is an integrated system that drills wells, such as oil or water wells, in the earth's subsurface. Drilling rigs can be massive structures housing equipment used to drill water wells, oil wells, or natural gas extraction wells. Drilling rigs can be mobile equipment mounted on trucks, tracks or trailers, or more permanent land or marine-based structures (such as oil platforms, commonly called 'offshore oil rigs' even if they don't contain a drilling rig). A service rig is a mobile platform loaded with service equipment that can be driven long distances to service wells. For the purposes of this document, a "drill rig" is all of the above.

Various embodiments of the present invention provide a system and method for communicating with equipment (assets) on a plurality of skids associated with a drill rig. The system generally includes one or more sensors associated with the equipment on the plurality of skids in wired or wireless communications with a data acquisition board disposed on the drill rig. Other assets not on skids may also be associated with sensors in communication with the data acquisition board. The sensor data may include an operating parameter of the equipment on the plurality of skids which may include, for example, temperature, pressure, speed, depth, weight, volume, or other operating parameters for various equipment on the drill rig. The sensor data may also include unique identification information for the skid, location information that defines or can be used to define the location of the skid, a timestamp, weather conditions, weather forecasts, location of the drill rig, and/or attitude (e.g., pitch and yaw) of the drill rig.

The system establishes a predefined reference point on the drill rig. The data acquisition board may include a processor configured to execute a first logic stored in a first memory that causes the processor to receive data from each sensor within a project area defined by a predetermined distance from the predefined reference point. Alternatively, the first logic may cause the processor to receive data from each sensor included in a first predetermined list of the equipment on the skids and within the project area. Notably, the processor may be located on the drill rig or off the drill rig such as on the remote database server.

The first logic further causes the processor to format the received data and transfer the formatted or unformatted received data to a remote database server. Periodically (at random, unequal or equal intervals), continuously, or upon request, the data acquisition board may further transfer and/or synchronize the received data with a personal communications device such as a smartphone or a tablet, and the personal communications device may further transmit the data to a database server remote from the drill rig. Alternatively, or in addition, the data acquisition board may transmit the received data directly to the database server. The database server allows a data user to access the data.

The processor and/or database server may be configured to use the data to generate an onsite asset list which represents equipment within the predetermined project area. The processor may further receive offsite data from assets outside the predetermined project area but within the communication range of the processor. The processor may be configured to receive and format the offsite data and transmit the formatted or unformatted offsite data to the database server. The processor and/or database server may be further configured to use the offsite data to generate an offsite asset list or to cause a local or remote device to generate a graphical user interface that presents the information in any suitable format desired by a user.

The processor and/or the database server may be further configured to receive project type information from each other or one of a local personal device or a remote personal device. Project type information is information describing the type of work project that may be scheduled to occur in the future. For this embodiment, the processor and/or database server may be configured to execute a logic that causes the processor and/or database server to use the project type information to access a historical asset list stored in a memory for the project type. One example of a historical asset list is a list of assets that have been needed in the past for a particular project. The historical asset list may be based on experience, and it may be automatically created over time by an algorithm executed by the processor and/or database server. The processor and/or database server may compare the onsite asset list with the historical asset list and generate a missing asset list if there is an asset listed in the historical asset list that is not listed on the onsite asset list.

The historical asset list may also be a list of assets previously determined to be in a predetermined area such as a project area. Such a historical asset list would be useful to detect borrowed or stolen property. Other types of lists may be generated as well using historical information.

In this manner, the systems and methods described herein may enable a user to remotely communicate with the drill rig to receive real-time or near real-time data from the drill rig regarding the equipment associated with the drill rig on skids or other similar structure that makes assets more mobile, group assets based on their location, and allocate the assets for future projects as well as monitor the assets during a project.

The present disclosure refers to sensors, processors, database servers, logic, memory, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, methods discussed herein may be implemented using a single server or multiple servers working in combination. Similarly, databases and logic for manipulating the databases may be implemented on a single system or distributed across multiple systems sequentially or in parallel. Data transferred between components may travel directly or indirectly. For example, if a first device accesses a file or data from a second device, the access may involve one or more intermediary devices, proxies, and the like. The actual file or data may move between the components, or one device may provide a pointer or metafile that the other device uses to access the actual data from a still further device.

The various computer systems discussed herein are not limited to any particular hardware architecture or configuration. Embodiments of the methods and systems set forth herein may be implemented by one or more general-purpose or customized computing devices adapted in any suitable manner to provide the desired functionality. The device(s) may be adapted to provide additional functionality complementary or unrelated to the present subject matter, as well. For instance, one or more computing devices may be adapted to provide desired functionality by accessing logic or software instructions rendered in a computer-readable form. When software is used, any suitable programming, scripting, or other type of language or combinations of languages may be used to implement the teachings contained herein. However, software need not be used exclusively, or at all. For example, some embodiments of the systems and methods set forth herein may also be implemented by hard-wired logic or other circuitry, including, but not limited to application-specific circuits. Of course, combinations of computer-executed software and hard-wired logic or other circuitry may be suitable, as well.

Embodiments of the systems and methods disclosed herein may be executed by one or more suitable computing devices. Such system(s) may include one or more computing devices adapted to perform one or more embodiments of the methods disclosed herein. As noted above, such devices may access one or more computer-readable media that embody computer-readable instructions which, when executed by at least one computer, cause the computer(s) to implement one or more embodiments of the methods of the present subject matter. Additionally, or alternatively, the computing device(s) may include circuitry that renders the device(s) operative to implement one or more of the methods of the present subject matter. Furthermore, components of the presently disclosed technology may be implemented using one or more computer-readable media. Any suitable computer-readable medium or media may be used to implement or practice the presently-disclosed subject matter, including, but not limited to, diskettes, drives, and other magnetic-based storage media, optical storage media, including disks (including CD-ROMs, DVD-ROMs, and variants thereof), flash, RAM, ROM, and other memory devices, and the like.

Figure 3:
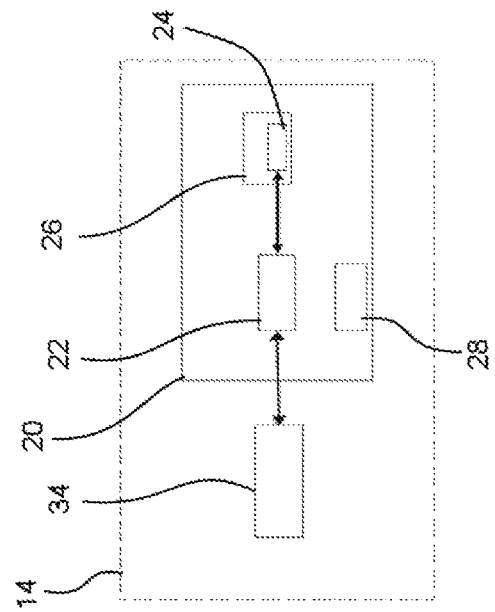
FIG. 3 is a block diagram of an exemplary alternative embodiment of a data acquisition board.
Figure 2:
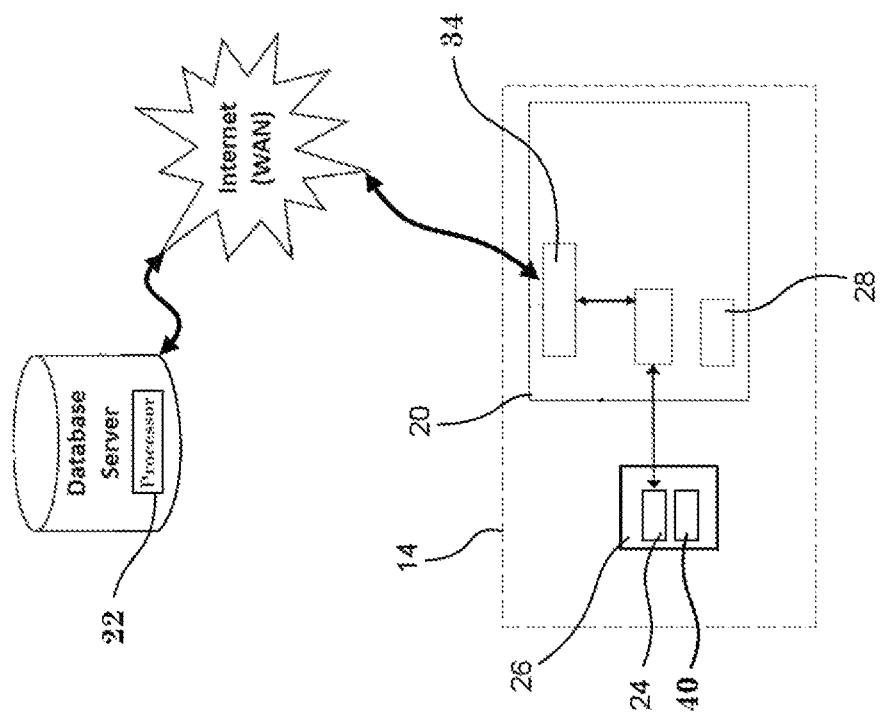
FIG. 2 is a block diagram of an exemplary data acquisition board configuration.

Referring now to the drawings, wherein identical numerals indicate the same elements throughout the figures, FIG. 1 provides a block diagram of an exemplary system and method 10 for communicating between equipment on a plurality of skids 12 associated with a drill rig 14 and a database server 16 remote from the drill rig 14 according to one embodiment of the present invention. The system 10 may include a plurality of sensors 18 on the drill rig 14, wherein each sensor 18 transmits data associated with the equipment on the plurality of skids 12 to a data acquisition board 20, wherein the data includes an operating parameter of the equipment on the plurality of skids 12. The system 10 includes a predefined reference point 32 on the drill rig. A processor 22 in communication with the data acquisition board 20 is configured to execute a first logic 24 stored in a first memory 26 (FIG. 2 and FIG. 3). The first memory 26 may be memory onboard processor 22 or a memory electrically associated with processor 22. A communications link between the processor 22 and remote database server 16 may include one or more wired, wireless, or other suitable communication links known to one of ordinary skill in the art for transferring data between components.

The data acquisition board 20 may be contained within a protective housing on the drill rig 14 to insulate the data acquisition board 20 from the environment. The degree and type of protection the housing provides are dictated by the environment in which the data acquisition board 20 is used (e.g., weatherproof, hermetically sealed, etc.). The data acquisition board 20 and associated components may be powered by an onboard power source 28 or an external power source (not shown). For example, an external power source associated with the skid 12 may power the data acquisition board 20 when the skid is operating, and the onboard power source 28 may power the data acquisition board 20 when the external power source is not supplying power. The data acquisition board 20 may be on a skid or associated with a support structure and placed at a predefined reference point 32 or another location on the drill rig 14.

The first logic 24 may cause the processor 22 to receive data from each sensor 18 within a project area 30 defined by a predetermined distance from the predefined reference point 32, format the received data, and transfer the received data to the database server 16. The data may be transmitted to the database server 16 in unformatted or formatted form. The processor 22 may be electrically associated with communication technology 34 (described in detail later) to transmit the data to other devices.

The project area 30 may take any shape. Where the project area 30 is a circle, the predetermined distance may be the radius of the circle. Such a configuration is particularly useful when the data acquisition board 20 is located at or near the predefined reference point 32. That said, as depicted in FIG. 1, it is not required for the data acquisition board 20 to be located at or near the predefined reference point 32. When the project area 30 is a rectangle, for example, the predetermined distance may be a first distance (e.g., length) and a second distance (e.g., width) from the predefined reference point 32 (although a square would only need one distance parameter). Thus, the parameter defining the predetermined distance from the predefined reference point 32 may be a single distance parameter or multiple distance parameters as needed to define the shape of the project area 30.

Figure 5:
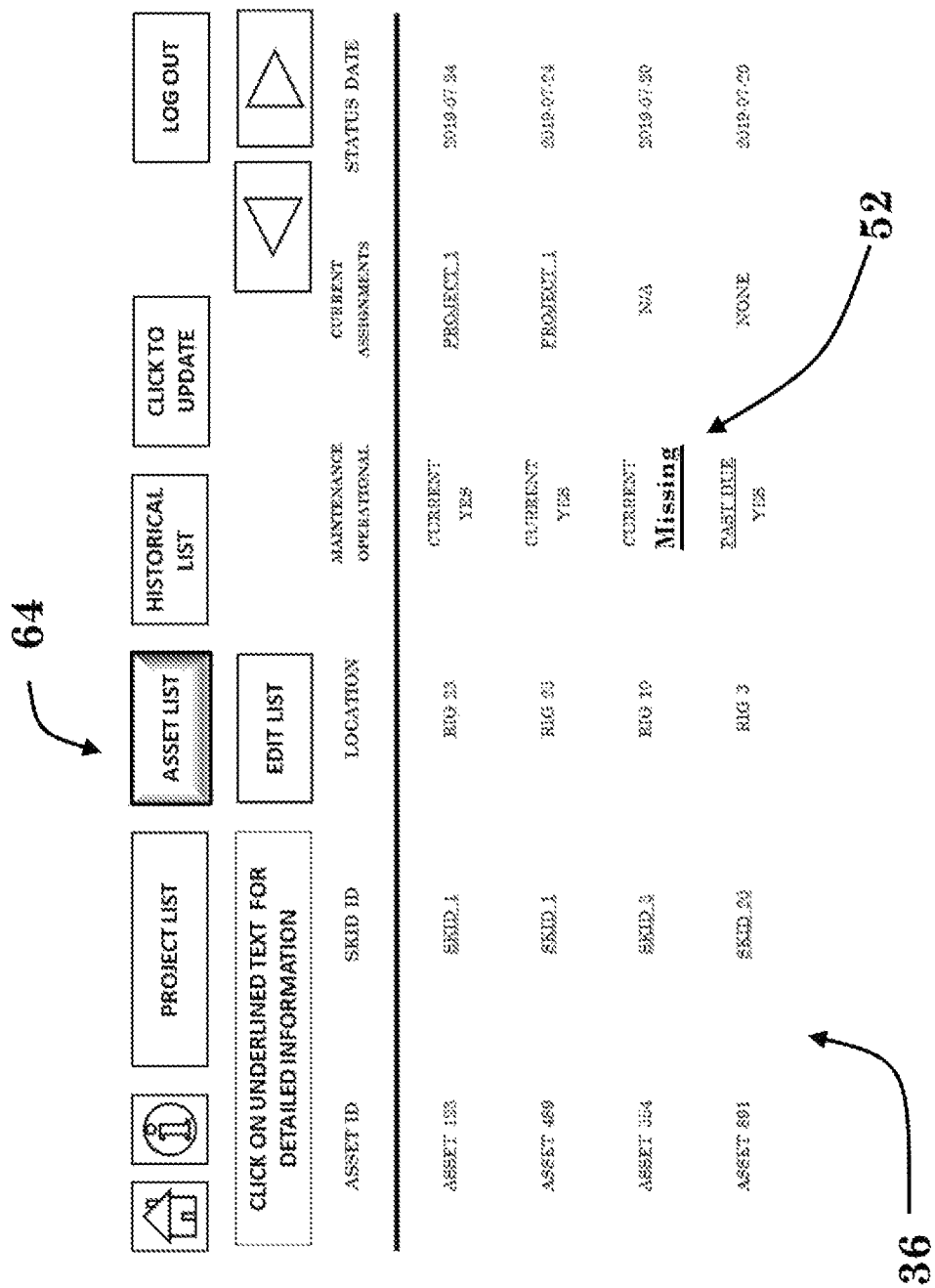
FIG. 5 is a screenshot of an exemplary graphical user interface depicting an Asset List display.

As noted above, the data from the sensors 18 may include skid identification information and/or skid location information that can be used to identify the skid 12, the equipment on the skid 12, and the location of the skid 12. The processor 22 and/or the database server 16 may be configured to use such data to generate a list of assets detected within the project area 30 thereby defining an onsite asset list 36 (FIG. 5). Note that the exemplary GUI in FIG. 5 presents/mixes several lists in its display.

As shown in FIG. 1, the system may further include a camera 38, and the processor 22 may be further configured to execute a second logic 40 stored in the first memory 26 that causes the processor 22 to activate the camera 38 to obtain a visual image of the equipment on the skids 12 within the predetermined distance (e.g., project area 30). Such a camera 38 may be associated with mobile technology such as drone technology. Drone technology is well known by those of ordinary skill in the art, and a description thereof is not provided.

The processor 22 or database server 16 may be further configured to receive project type information 42 (FIG. 4) from the data acquisition board 20 or any one of a local personal device 44, a remote personal device 46, or a local data center 48 (FIG. 1). The processor 22 or database server 16 may be configured to use the project type information 42 and a historical asset list 50 (FIG. 6) stored in a memory and compare the onsite asset list 36 with the appropriate historical asset list 50 for the project type to generate a missing asset list 52.

The historical asset list 50 may be a list of onsite assets 54 (FIG. 6) that were previously detected in a project area 30. Alternately, the historical asset list 50 may be a list of required assets 56 that experience indicates are required for a particular project type 30. Such historical asset lists may be manually or automatically created or updated as new information becomes available.

The first logic 24 may further cause the processor 22 to receive data from sensors outside the project area 30 where such data represents offsite assets 58. The processor 22 may format the received data, tag such data as offsite data, generate an offsite asset list, and transfer the offsite data or the offsite asset list to a device such as the database server 16, a local data center 48, a local personal device 44, or a remote personal device 46. At least one of the processor 22 or database server 16 may be configured to compare the offsite asset list to the missing asset list 52 and generate notifications based on such comparisons. For example, a notification may be generated for the assets determined to be on both the offsite asset list 54 and the missing asset list 52. One of ordinary skill in the art will appreciate that such notification would allow the automatic or manual asset reallocation to meet a future need.

One alternative embodiment of the system 10 for communicating between equipment on the skids 12 associated with the drill rig 14 and the database server 16 remote from the drill rig 14 includes the data acquisition board 20, sensors 18, and processor 22, as previously described. The processor 22 may be configured to execute the first logic 24 stored in the first memory 26 that causes the processor 22 to receive the data from each sensor 18 included in a first predetermined list of the equipment on the skids 12, format the received data, and transfer the received data to the database server 16 remote from the drill rig 14. Any type of predetermined list may be used, such as the onsite asset list 36, the offsite asset list, a needed asset list, the list of equipment within the project area 30, or the list of missing assets 52.

Figure 6:
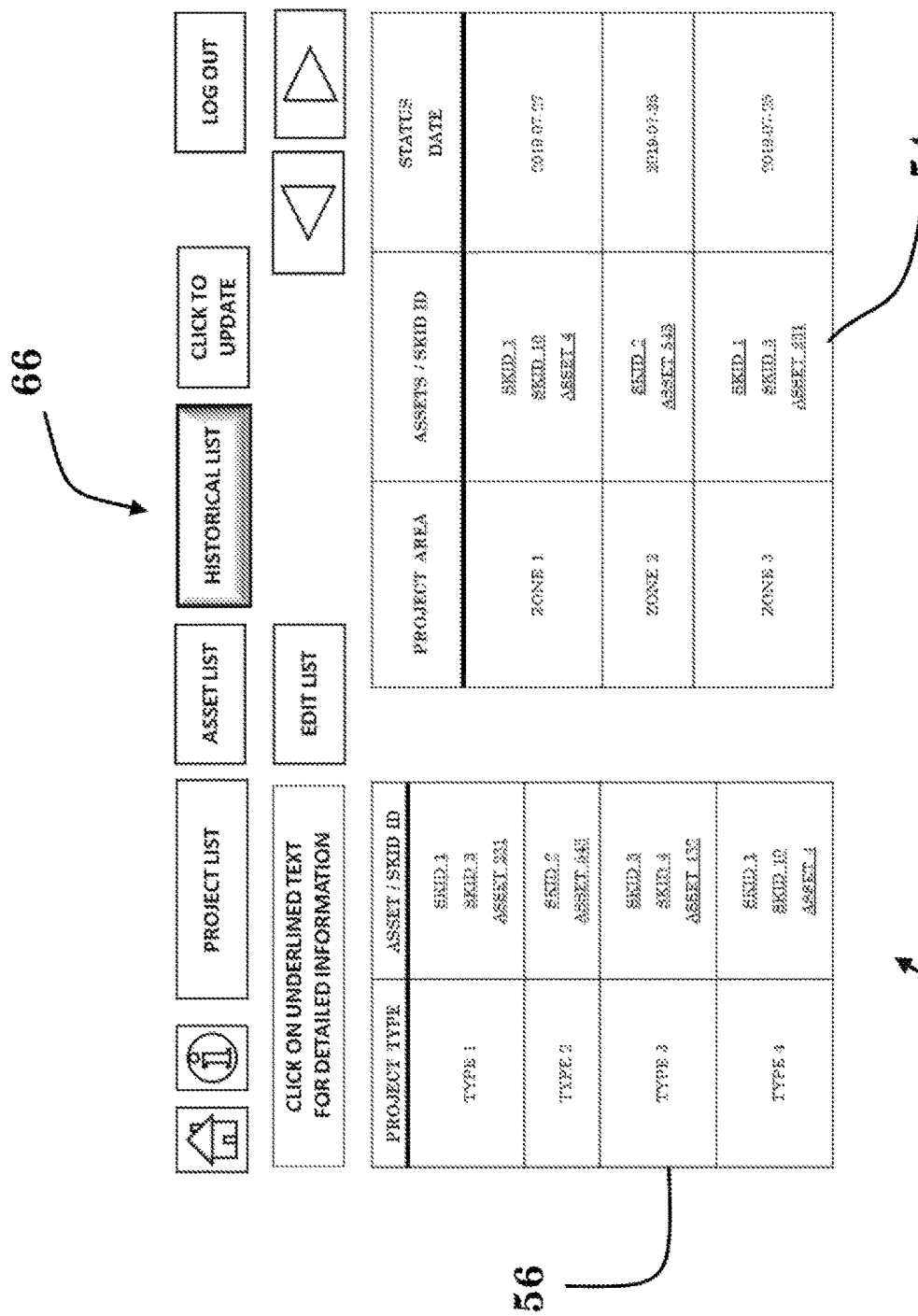
FIG. 6 is a screenshot of an exemplary graphical user interface depicting a Historical List display.

As further shown in FIG. 4, FIG. 5 and FIG. 6, the various data and lists generated using the sensor data may be transmitted to one or more graphical user interfaces (GUI) for display on a local personal device 44, a remote personal device 46, local display device or a remote display device 60. FIG. 4 presents an exemplary project list GUI 62 presenting a project list showing project type information 42 and associated data. FIG. 5 presents an exemplary Asset List GUI 64 presenting a list of assets that includes onsite assets, offsite assets and missing assets. Similarly, FIG. 6 presents a Historical List GUI 66, which presents at least part of the data that is used to determine the missing asset list 52 as well as other lists. The GUIs may be configured for any type of a personal electronic device (mobile or stationary) including smartphones, tablets, computers, or other communication devices selected by a user. Further, a user may select the method (e.g., e-mail, text, dashboard alert, etc.) by which the user may receive data and notifications from the processor 22 or database server 16 or other electronic devices connected to the system 10.

Logic Algorithm

Figure 7:
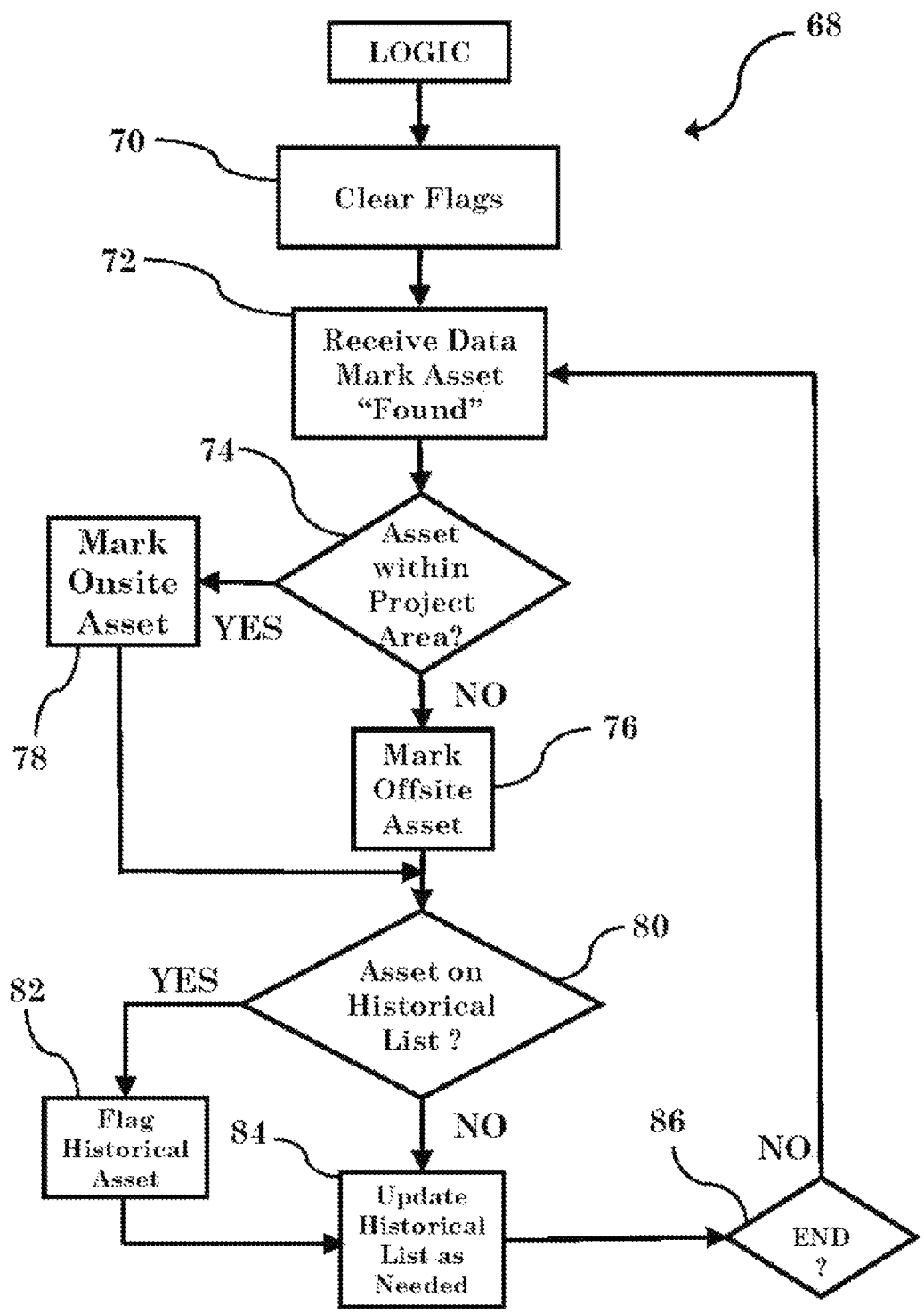
FIG. 7 is a flow chart of an exemplary Logic Algorithm.

Referring now to FIG. 7, one exemplary logic algorithm 68 for detecting missing assets and updating a historical asset list 50 is presented. Preferably a user manually executes, or an algorithm automatically executes, the logic algorithm 68 when updated information is desired. At block 70, the relevant flags associated with elements of the historical asset list 50 are cleared as needed and a "Ping" is transmitted. A "ping" is simply an "anybody out there" signal requesting assets to respond. For this example, all assets that respond are associated with a "found flag". If the "found flag' is set, the asset's location is known. One of ordinary skill in the art will appreciate that many flagging methods can be used. At block 72, the processor 22 receives data from a sensor 18 (or multiple sensors, but this example will focus on one sensor response), and the associated asset is marked "Found." At block 74, the processor 22 determines if the asset associated with the sensor 18 data is within the project area 30 (e.g., defined by a predetermined distance from the reference point 32 on the drill rig 14). If no, at block 76, the asset is tagged as an offsite asset 58, and program control is passed to block 80, and the processor 22 determines if the asset is listed on a historical asset list. If yes, program control passes to block 82 and the asset is marked "Missing," (here, "missing" means missing from the project area 30; notably, any naming scheme can be used). If no at block 80, program control passes to block 84 where the historical asset list is updated as needed.

If yes, at block 74, program control passes to block 78, and the asset is tagged as an onsite asset 54, and program control is passed to block 80. At block 80, the asset is compared to a historical assets list 50. If the asset is on the historical asset list, the asset is marked as a historical asset at block 82, and program control passes to block 84. If the asset is not on the historical asset list 50, program control passes directly to block 84 where the historical asset list 50 is updated as needed.

Notably, if an "onsite" asset is found on the historical list for the assets needed for a project type (for example), such would be expected and no additional action may be needed other than updating a GUI. In contrast, if an "onsite" asset is not found on the historical asset list, an historical asset list update action may be needed. One possible updated action is to add a new asset to the historical asset list. Similarly, if an "offsite" asset is found in the historical asset list, such asset is "missing" from the project area (though its location is known) and may be misallocated and need to be reassigned.

After the historical asset is updated as needed at block 84, program control passes to block 86 where the algorithm determines if it should end execution or look for more data and run the algorithm again.

Figure 8:
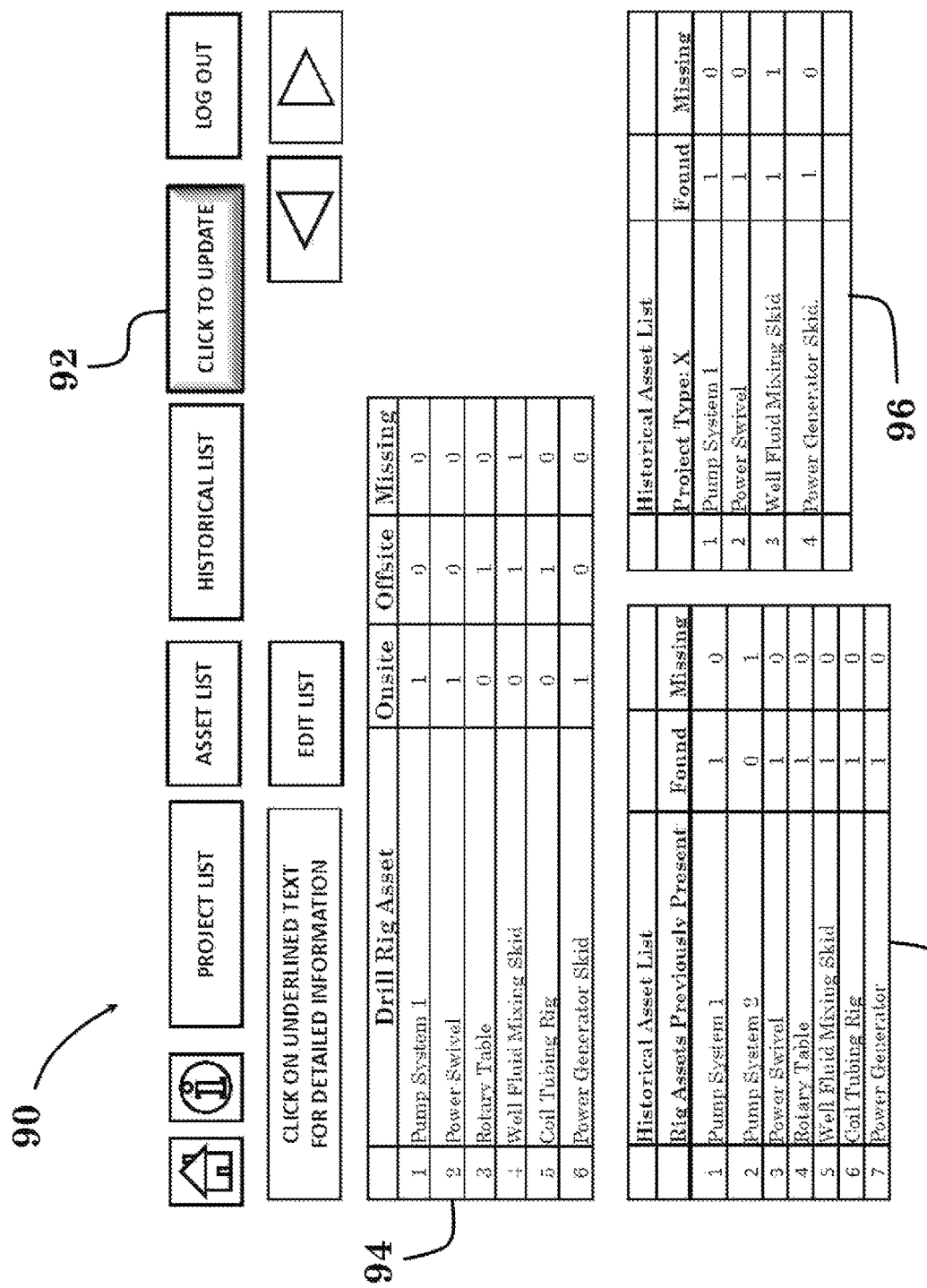
FIG. 8 is an exemplary GUI depicting output from the exemplary Logic Algorithm.

By way of example, FIG. 8 shows an exemplary GUI 90 for generating and updating lists. A user manually updates 92, or an algorithm executes the logic algorithm 68 which asks: "Is there anybody out there?" (i.e., generates a ping). Assets 94 that receive the message respond and the logic algorithm 68 determines: (1) Pump System 1, (2) Power Swivel, (3) Rotary Table, (4) Well Fluid Mixing Skid, (5) Coil Tubing Rig, and (6) Power Generator Skid are located at the drill rig. Of those assets, Pump System 1, Power Swivel, and Power Generator are "Found" to be "Onsite" and the remainder are "Found" to be "Offsite." A predetermined Historical Asset List 96 has been selected for a Type X activity comprising assets: Pump 1, Power Swivel, Well Fluid Mixing Skid, and Power Generator Skid. The logic algorithm determines the Well Fluid Mixing Skid is "Missing" which in this case means the asset is not in the Project Area X but its location is known. A user may then reallocate the Well Fluid Mixing Skid for the upcoming Project X activity.

The algorithm may further access a Historical Asset List for Rig Assets Previously Present 98 at the drill rig site which comprises: Pump System 1, Pump System 2, Power Swivel, Rotary Table, Well Fluid Mixing Skid, Coil Tubing Rig, and Power Generator Skid. Here, the logic algorithm determines the Pump System 2 is "Missing" because its location is not known (no response from the ping; any suitable naming/labeling scheme may be used). Such could indicate theft or misallocation. A mobile or stationary camera might then be accessed to take an image of the asset's last known location. If the asset is where it should be such would be a good indication of technical problems with the system.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for communicating between equipment on a plurality of skids associated with a drill rig and a database server remote from the drill rig, the system comprising:
   a data acquisition board on the drill rig;
   a plurality of sensors on the drill rig, wherein each sensor transmits data associated with the equipment on the plurality of skids to said data acquisition board, wherein said data comprises an operating parameter of the equipment on the plurality of skids;
   a predefined reference point on the drill rig;
   a processor in communication with said data acquisition board and configured to execute a first logic wherein said first logic is stored in a first memory;
   wherein said first logic causes said processor to receive said data from each sensor within a project area defined by a predetermined distance from said predefined reference point, format said received data, and transfer said received data to the database server remote from the drill rig.

2. The system as in claim 1, further comprising a camera, and said processor is further configured to execute a second logic stored in said first memory that causes said processor to activate said camera to obtain a visual image of the equipment on the plurality of skids within said predetermined distance.

3. The system as in claim 1, wherein said data comprises skid identification information, and said processor uses said skid identification information to generate an onsite asset list.

4. The system as in claim 3, wherein the data acquisition board generates project type information, and said processor is further configured to execute a second logic stored in said first memory that causes said processor to access a historical asset list stored in said first memory and compare said onsite asset list with said historical asset list to generate a missing asset list.

5. The system as in claim 4, wherein said historical asset list defines a list of assets previously determined to be within said project area.

6. The system as in claim 4, wherein said historical asset list defines a list of assets historically required for a particular project type.

7. The system as in claim 4, wherein said first logic further causes said processor to receive said data from each sensor outside of said project area, format said received data, tag said data as offsite data, generate an offsite asset list, and transfer at least one of said offsite data or said offsite asset list to the database server.

8. The system as in claim 7, wherein said first logic further causes said processor to compare said offsite asset list to said missing asset list and generate a notification for each asset on both said offsite asset list and said missing asset list.

9. A system for communicating between equipment on a plurality of skids associated with a drill rig and a database server remote from the drill rig, the system comprising:
   a data acquisition board on the drill rig;
   a plurality of sensors on the drill rig, wherein each sensor transmits data associated with the equipment on the plurality of skids to said data acquisition board, wherein said data comprises an operating parameter of the equipment on the plurality of skids and skid identification information for said operating parameter;
   a processor in communication with said data acquisition board configured to execute a first logic stored in a first memory;
   wherein said first logic causes said processor to receive said data from each sensor included in a first predetermined list of the equipment on the plurality of skids, format said received data, and transfer said received data to the database server remote from the drill rig.

10. The system as in claim 9, further comprising a camera, and said processor is further configured to execute a second logic stored in said first memory that causes said processor to activate said camera to obtain a visual image of the equipment on the plurality of skids in said first predetermined list.

11. The system as in claim 9, wherein said processor is further configured to communicate with said remote server to determine a predefined project area.

12. The system as in claim 11, wherein said data further comprises location information of the equipment and wherein said first logic causes said processor to generate an onsite asset list for assets within the project area.

13. The system as in claim 12, wherein said first logic further causes said processor to receive said data from sensors outside of said project area, format said received data, tag said data as offsite data, and generate an offsite asset list.

14. The system as in claim 13, wherein said first logic further causes said processor to transfer at least one of said onsite asset list or said offsite asset list to the database server.

15. The system as in claim 9, wherein said data acquisition board is placed on the drill rig thereby defining a predefined reference point and wherein said first logic causes said processor to receive said data from each sensor included in said first predetermined list and within a predetermined distance from said predefined reference point.

16. The system as in claim 15, wherein said data further comprises location information and said first predetermined list is a historical list of equipment previously determined to be within the predetermined distance from said predefined reference point.

17. The system as in claim 15, wherein said data further comprises location information and where said first logic causes said processor to receive said data from each sensor included in a second predetermined list and outside a predetermined distance from said predefined reference point.

18. The system as in claim 17, wherein said second predetermined list is an offsite asset list.

19. The system as in claim 17, wherein said second predetermined list is a missing asset list.

20. The system as in claim 17, wherein said second predetermined list is a needed asset list.

\* \* \* \* \*